Patented Aug. 19, 1952

2,607,748

UNITED STATES PATENT OFFICE 2,607,748

FLEXIBLE CORK COMPOSITIONS HAVING A RUBBERLIKE BINDER AND METHOD OF MAKING THE SAME

John W. Wiley, Lancaster, Pa., assignor to Armstrong Cork Company, Lancaster, Pa., a corporation of Pennsylvania No Drawing. Application March 19, 1947, Serial No. 735,815

6 Claims. (Cl. 260—17.4)

This invention relates to cork compositions and a method of making the same. More particularly, the invention relates to flexible cork compositions and a method of making cork composition having a binder of rubber-like material, in which method the binder is admixed with cork particles in the form of an aqueous dispersion of binder such as a rubber latex and coagulated in the presence of the cork particles prior to molding or other shaping operations.

Cork compositions comprising cork particles and a suitable binder have been widely used in various fields in the form of gaskets, liners for closures, insulation, shoe products, for example, midsoles, and the like, and other similar or related uses. Numerous materials have been suggested for use as a binder for the granulated cork. However, many of these materials have had certain disadvantages in that they are not suitable for use in the manufacture of certain products such as closure liners as the binder portion of the composition possesses or imparts a disagreeable odor to the cork, thus rendering the composition undesirable for use in sealing containers for foods and beverages. Other binders are undesirable from the point of view that they are permeable to liquids or gases, thus greatly reducing the efficiency of any product to be employed as a gasketing material where low permeability is desired. Still other binders are affected by high temperatures, thus rendering the composition unsuitable for use in the manufacture of materials to be used in or near equipment operating at elevated temperatures.

Rubber-like materials have been proposed as binders for cork composition as they possess certain characteristics which are highly desirable. Cork compositions containing rubber-like binders may be employed in the manufacture of closure liners, in the manufacture of gaskets, in the manufacture of shoe products, and in other fields in which cork compositions are widely utilized. However, considerable difficulty has been experienced in the processing of cork composition prepared from granulated cork and rubber-like binders. For instance, when the rubber-like material is added in the form of an aqueous dispersion, such as a latex, it has heretofore been the practice to admix the cork particles and latex, and thereafter mold the mixture under such conditions as to coagulate the latex in the mold. This procedure causes considerable difficulty in that the composition containing cork particles and uncoagulated latex is extremely difficult to handle. Due to the presence of uncoagulated latex in the composition, considerable quantities of binder are attached to parts of the equipment utilized in processing the material.

While methods have been utilized involving the use of natural or synthetic latices as binders for fibrous materials, in which methods the latices are at least partially coagulated prior to admixture with fibrous materials, such a procedure is unsuitable for use in the manufacture of cork compositions in that precoagulation before mixing results in a weak product. Cork compositions prepared from granulated cork and latices which have been coagulated before admixture with the cork, upon visual examination, show comparatively large rubber spots throughout the composition, thus indicating that the precoagulated rubber is not uniformly distributed over the cork particles, thereby resulting in a product having comparatively weak portions which cause rapid failure in service.

It is, accordingly, an object of this invention to provide a method of making cork composition of improved flexibility.

It is a further object of this invention to provide a method of making a flexible cork composition which method is capable of producing a composition of predetermined air permeability.

Still another object of this invention is the provision of a method of making cork composition which method may be practiced at low cost.

A further object of this invention is the provision of a rapid method of making cork composition which may be practiced in conventional equipment.

These and other objects of this invention will become apparent to those skilled in the art upon becoming familiar with the following description.

I have found that cork compositions having a rubber binder and characterized by high strength, good flexibility, tear resistance, and, if desired, excellent air permeability, may be prepared by a method which includes compounding a rubber latex with vulcanizing agents and other ingredients which may vary depending upon the final properties desired, adding the resulting mixture to granulated cork in a suitable mixing device and mixing the resulting mixture of cork and compounded latex under conditions such that the cork particles are evenly coated with the rubber and the rubber is coagulated, and thereafter, molding the mixture of cork particles and coagulated rubber under heat and pressure for a desired period of time which is sufficient to cure the binder.

The latices which may be employed in the practice of my invention may be a natural rubber latex, artificial dispersions of natural rubber, or may be the various synthetic rubber latices known to the art. Thus, latices of butadiene polymers; for example, polybutadiene, copolymers of butadiene and styrene (known as GR–S, and "Buna S"), and copolymers of butadiene and acrylonitrile (known as "Hycar," "Chemigum," and "Perbunan"), may be employed as binders. Other rubber-like materials which may be utilized include polymers obtained from substituted butadienes, such as chloroprene, a chlorinated butadiene. Chloroprene polymers are known to the art as "neoprene." Broadly speaking, therefore, the term "a rubber" or its equivalent, as used herein, is intended to include natural rubber and synthetic rubber. By the term "synthetic rubber" is meant those synthetic substances which are commonly referred to as "synthetic rubbers" and which have physical properties resembling those of natural rubber, as set forth, for example, in the definition of synthetic rubber appearing on pages 3 to 4 of the Circular C427 of the United States Department of Commerce entitled "Synthetic Rubbers: A Review of Their Compositions, Properties, and Uses" by Lawrence A Wood, issued June 25, 1940; and on page 9 of "Natural and Synthetic Rubbers," by Harry L. Fisher, being Edgar Marburg Lectures of 1941 presented before the Forty-Fourth Annual Meeting of the American Society for Testing Materials. Generally speaking, particularly advantageous results may be obtained by utilizing synthetic rubbers such as butadiene-styrene copolymers, butadiene-acrylonitrile copolymers, and chloroprene polymers. Such materials, in addition to being more oil resistant than natural rubber, may be more readily admixed and coagulated from latices in the presence of cork particles.

The ratio of rubber solids to cork particles employed in the manufacture of cork composition in accordance with the method of my invention, may be widely varied depending, among other things, upon the particular products to be made. For instance, the ratio to be employed in the manufacture of a gasket may vary somewhat from the ratio employed in the manufacture of a shoe product. However, generally speaking, advantageous results may be obtained by employing about 25 to 80 parts by weight of rubber solids to 100 parts by weight of cork particles.

In one embodiment of my invention, the mixture of rubber latex, vulcanizing agent, and, if desired, suitable softening agents, fillers, wetting agents, and the like, is formed and poured over ground cork in a suitable mixer. While the addition of the compounded latex to the cork is taking place, the materials are advantageously agitated to obtain even coating of the cork particles and coagulation of the rubber content of the latex. This coagulation is effected while the mass contains considerable quantities of water which is due to the use of a latex in the mixing step. While I do not intend to be limited to any particular theory of operation advanced herein, it is believed that the cork particles absorb sufficient water from the latex to cause coagulation thereof. This is assisted by the presence of acidic material in the cork particles which tends to neutralize stabilizers present in rubber latex. The rate of coagulation is dependent upon the compounding of the latex. It is, therefore, advantageous to test the stability of the latex prior to admixing with the cork particles. This may be done by any of a number of methods well known to the art.

Thus, in accordance with my invention, a latex of predetermined stability is advantageously employed. The presence of vulcanizing agents, softeners, fillers, and the like, in the latex compound employed in my invention regulates the rate of coagulation of the latex. It is advantageous to employ a latex so compounded as to remain stable sufficiently long to allow uniform distribution over the cork and which, upon further agitation, coagulates.

While the time required for the coagulation of the latex to take place may vary, depending upon the particular latex employed, the size of the batch, and the like, generally speaking, in the practice of my invention, coagulation is effected by agitating the cork-latex mixture for about 2 to 10 minutes. In other words, the coagulation step of my process is completed while the mass is wet and prior to the time it is charged into the mold.

Following the coagulation, the mass is charged into the mold and heated at an elevated temperature between about 220° F. and 275° F., advantageously between about 240° F. and 260° F. At temperatures below about 220° F., removal of water is difficult, whereas at temperatures above about 275° F., charring of the cork and scorching of the rubber may occur. Heating is continued for a time sufficient to remove substantially all of the water from the mass and to vulcanize the rubber binder. While the time required to accomplish the desired elimination of water and vulcanization of the binder may vary, depending, among other things, upon the temperature employed and the thickness of the article being molded, generally speaking, approximately 10 to 14 hours at the above-indicated temperature are sufficient.

During the molding operation, varying pressures may be applied to the cork composition. The pressure to be employed is governed by the type of article desired. For instance, if an article of low density is to be made, pressures on the order of 25 pounds per square inch to 50 pounds per square inch are generally applied to the mass. On the other hand, when high density materials are desired, pressures as high as 400 pounds per square inch may be employed. Generally speaking, in the embodiment of my invention involving the removal of water in the mold, low pressures are employed.

After the desired period of time in the mold at the desired pressure and temperature, the mold is cooled by any suitable means, and the final composition is removed therefrom and is ready for use.

In the molding operation, the conditions are advantageously adjusted so that the composition loses substantially all of the water content thereof, thereby giving a final product having the density desired, depending upon the charge added to the mold. For all practical purposes, the water content of the mass is reduced to 5% or less.

This embodiment of my invention offers a particular advantage in that the use of a wet mass results in better cohesion of the binder, thereby producing a product having better flexibility and high tensile strength. In other words, the films of binder are firmly attached to the cork and to each other, thus resulting in the production of a stronger product. This procedure is particularly advantageous in the manufacture of low density cork compositions. With low density cork compositions, the products are more permeable, thus enabling the ready removal of water from the mass in the mold. However, if desired, in the manufacture of low density compositions, the material may be dried before packing, thereby reducing somewhat the period of time required in the mold.

However, when a high density product is desired, that is, one in which the cork particles are closely packed, water removal in the mold, such as illustrated above, is fairly difficult. Thus, it may be desired to remove at least a portion of the water content of the mass prior to the molding step. In this embodiment of my invention, the mixture containing latex, vulcanizing agent, and other ingredients is formed and then poured over the cork particles and agitated to obtain intimate mixing and uniform distribution over the cork particles together with coagulation of the binder while the mass is wet. Following the distribution and coagulation of the latex, the resulting mass is subjected to drying. In the drying operation, all or a portion of the water may be removed as desired. Generally speaking, in this embodiment of my invention, it is advantageous to reduce the water content down to as low as 5% of the mass. The thus dried mass is then charged into the mold and heated under pressures such as a pressure of 400 pounds per square inch at an elevated temperature to obtain the final product.

My invention may be more readily understood by reference to the following specific examples:

Example I

A vulcanizing dispersion was formed from the following ingredients:

|  | Parts |
|---|---|
| Powdered sulfur | 200 |
| Zinc oxide | 500 |
| Tuads (tetramethyl thiuram sulfide) | 100 |
| Methyl zimate | 25 |
| Darvan (polymerized organic salts of alkyl aryl sulfonic acids) | 33 |
| Casein | 25 |
| Ground bentonite | 17 |
| Ammonium hydroxide | 9 |
| Water | 541 |

The above ingredients were weighed and placed in a pebble mill which was allowed to run for 72 hours when the vulcanizing dispersion was ready for use.

A light mineral oil emulsion was then prepared containing 48.5 parts water, 1.5 parts "Aquarex D" (a sodium salt of the sulfate monoesters of a mixture of higher fatty alcohols consisting chiefly of the lauryl and myristyl derivatives), and 120 parts of light mineral oil (Sun Light Process Oil). When preparing this mixture, water and the "Aquarex D" were added to a mixing container equipped with a "Lightning" type mixing stirrer. The ingredients were mixed for 3 to 5 minutes to dissolve the "Aquarex D," and the oil was added while the mixer was running. Ten minutes additional mixing after the oil was added was sufficient to thoroughly emulsify it.

A binder was prepared from 60% GR-S latex, the light oil emulsion, and the vulcanizing dispersion in the following proportions:

|  | Wet | Dry |
|---|---|---|
|  | Parts | Parts solids |
| 60% GR-S #3 Latex | 84 | 50 |
| Light Oil Emulsion | 7.15 | .5 |
| Vulcanizing Dispersion | 7.25 | 4.12 |

The latex was placed in a suitable mixing tank equipped with a slow speed sweep type stirrer. The stirrer was started and the softener emulsion was added. After one or two minutes had elapsed, the vulcanizing dispersion was then added slowly, and the stirring continued until all the ingredients were thoroughly mixed, which took about 5 minutes.

One hundred parts of 10/30 mesh cork particles were placed in a suitable mixer and with the mixer running, 95.27 parts of the wet binder were poured over the cork granules slowly and mixing allowed to progress for about 10 minutes at which time all of the cork particles were thoroughly coated with the binder, and the latex was coagulated.

A charge of the above-prepared composition was then placed in a steel mold which was pressed and locked. The mold was then subjected to a temperature of 270° F. to 275° F., for 12 hours, thereby reducing the water content of the mat to about 5%, and vulcanizing the rubber binder. The mold was then removed to a cooling chamber where it was cooled for 2½ hours after which the mat was removed from the mold, ready for use.

Other examples of compositions which may be prepared in accordance with the process outlining Example I are given below:

Example II

Reground composition cork _____ parts __ 100

|  | Wet | Dry |
|---|---|---|
| 60% GR-S Latex | 84.0 | 50.0 |
| 70% Mineral Oil Emulsion | 7.15 | 5.0 |
| 25% Aquarex D Solution | 4.0 | 1.0 |
| 50% Vulcanizing Dispersion | 10.25 | 5.12 |

Example III

Reground composition cork _____ parts __ 100

|  | Wet | Dry |
|---|---|---|
| 60% Hycar O. R. Latex | 125.0 | 75.0 |
| 70% Mineral Oil Emulsion | 10.7 | 7.5 |
| 25% Aquarex D Solution | 6.0 | 1.5 |
| 50% Vulcanizing Dispersion | 15.5 | 7.72 |

Example IV

Reground composition cork _____ parts __ 100

|  | Wet | Dry |
|---|---|---|
| 60% Neoprene Latex | 42.0 | 25.0 |
| 70% Mineral Oil Emulsion | 3.57 | 2.5 |
| 25% Aquarex D Solution | 2.0 | .5 |
| 50% Vulcanizing Dispersion | 5.12 | 2.56 |

Example V

|  | Parts |
|---|---|
| Reground cork-rubber composition scrap | 50 |
| Ground standard cork | 50 |

|  | Wet | Dry |
|---|---|---|
| 60% GR-S Latex | 84.0 | 50.0 |
| 70% Mineral Oil Emulsion | 7.15 | 5.0 |
| 25% Aquarex D Solution | 4.0 | 1.0 |
| 50% Vulcanizing Dispersion | 10.25 | 5.12 |

Example VI

Ground standard cork _____ parts __ 100

|  | Wet | Dry |
|---|---|---|
| 60% Neoprene Latex | 84.0 | 50.0 |
| 70% Light Mineral Oil Emulsion | 10.7 | 7.5 |
| 25% Aquarex D Solution | 4.0 | 1.0 |
| 25% Tackifier Emulsion | 8.0 | 2.0 |
| 50% Clay Filler Dispersion | 20.0 | 10.0 |
| 57% Vulcanizing Dispersion | 13.2 | 7.5 |

While, in the above examples, certain ingredients have been set forth in certain proportions, it is to be understood that these are merely illustrative of my invention, and that other proportions may be employed as well as other ingredients. For instance, the mineral oil emulsion serves as a softening agent for the binder and may be replaced by other softening agents, such as soft coumarone-indene resin, asphalt, rosin derivatives; for example, hydrogenated methyl abietate, natural resins, and the like. Also, other stabilizing agents than the "Aquarex D" solution may be employed. For instance, such stabilizing agents as those sold commercially under the name of "Aerosols" may be employed. The "Aerosols" are dialkyl esters of sodium sulfosuccinic acid, such as diamyl ester of sodium sulfosuccinic acid, di-butyl ester of sodium sulfosuccinic acid, dihexyl ester of sodium sulfosuccinic acid, dioctyl ester of sodium sulfosuccinic acid, and the like. Another stabilizing agent which may be employed is that sold under the name "Santomerse" which is an alkyl aryl sulfonate. "Triton R–100," a sodium salt of a condensed aryl sulfonic acid, may also be employed as a stabilizing agent in the process of my invention. Such stabilizing agents as those mentioned herein may be classified as selected from the group consisting of surface active sulfates and surface active sulfonates.

Generally speaking, the process of my invention may be effectively carried out by employing compositions comprising 25 to 80 parts by weight of a rubber in the form of latex, 2.5 to 25 parts by weight of softening agent, .5 to 5 parts by weight stabilizing agent, and 2.6 to 8.2 parts by weight vulcanizing agent. Such a mixture is generally added to about 100 parts by weight cork particles and processed as described herein.

The process of my invention results in the production of excellent cork compositions which may be employed in a wide variety of uses in that the binder is not subject to deterioration at elevated temperatures, nor does it impart any disagreeable odor to the composition. The compositions, in addition, are flexible, and, if desired, possess high air permeability.

In regard to the flexibility of compositions prepared in accordance with my invention, a ⅛" thick sample may be bent repeatedly about a mandrel the same thickness as the sample, thus indicating that the compositions may be bent to an angle of approximately 180° without breaking.

The compositions possess an unusually high air permeability as evidenced by tests conducted on the Gurley Densometer. This instrument and the method of using it are described on page 73 of "Paper Testing Methods" published 1923 by T. A. P. P. I. The air permeability tests measure the rate of passage of air through a sample of ⅛" thickness clamped across a square inch opening in the device. Compositions made in accordance with my invention will pass 400 cc. of air at standard conditions of temperature in 15 to 30 seconds; whereas, other materials made by methods heretofore known, generally require 150 seconds and more to pass an equivalent quantity of air. Generally, other materials require between 200 and 500 seconds to pass 400 cc. of air through a sample of similar dimensions.

The process of my invention may be readily carried out on existing equipment at relatively low cost. Because of the coagulation of latex in the presence of cork particles while wet, there is no difficulty experienced from adhesion of uncoagulated latex to processing equipment, and, particularly, there is no troublesome sticking to the mold parts such as is generally experienced in methods of manufacturing cork composition, wherein coagulation is caused to take place in the mold.

As indicated above, products of variable air permeability may be prepared in accordance with my invention. For instance, in the manufacture of material for use as a shoe product, such as a midsole, in which the qualities of good flexibility and high air permeability are desired, the embodiment of my invention discussed above for obtaining such qualities would, of course, be followed. Whereas, when low permeability is desired, such as is the case in the manufacture of a gasket, my method may be adapted to the production of a material of low air permeability which still possesses good flexibility, which is desirable.

While my invention has been described with reference to certain particular embodiments and with reference to certain specific examples, it is to be understood that the invention is not limited thereby. Therefore, changes, omissions, substitutions and/or additions may be made without departing from the spirit of the invention as defined in the appended claims which are intended to be limited only as required by the prior art.

I claim:

1. A method of making cork composition which comprises forming a mixture containing a synthetic rubber latex of the group consisting of butadiene-styrene copolymer latex, butadiene-acrylonitrile copolymer latex, and chloroprene polymer latex, cork particles, and a vulcanizing agent, said composition containing about 25 to 80 parts by weight of synthetic rubber solids and about 100 parts by weight of cork particles, agitating the resulting mixture for about 2 to 10 minutes, thereby coagulating said synthetic rubber latex, charging the resulting mass to a mold, heating said mass in said mold at a temperature between about 220° F. and 275° F. and a pressure of from about 25 pounds per square inch to about 400 pounds per square inch, and removing from said mold a mass of cork composition containing less than about 5% water.

2. A method of making cork composition which comprises forming a mixture containing a synthetic rubber latex of the group consisting of butadiene-styrene copolymer latex, butadiene-acrylonitrile copolymer latex, and chloroprene polymer index, cork particles, and a vulcanizing agent, said composition containing about 25 to 80 parts by weight of synthetic rubber solids and about 100 parts by weight of cork particles, agitating the resulting mixture for about 2 to 10 minutes, thereby coagulating said synthetic rubber latex, charging the resulting mass to a mold, and heating said mass in said mold at a temperature between about 220° F. and 275° F. and a pressure of from about 25 pounds per square inch to about 400 pounds per square inch while reducing the water content of the mass to less than about 5%.

3. A method of making cork composition which comprises forming a mixture containing a vulcanizing agent, a synthetic rubber latex of the group consisting of butadiene-styrene copolymer latex, butadiene-acrylonitrile copolymer latex, and chloroprene polymer latex, and cork particles, said mixture containing about 25 to 80 parts by weight of synthetic rubber solids and about 100 parts by weight of cork particles, agitating the resulting mixture for a period of about 2 to 10 minutes, thereby coagulating said latex, reducing the water content of said mass containing coagulated rubber to less than about 5%, charging the resulting material to a mold, and heating said material at a temperature between about 220° F. to 275° F. and at a pressure between about 25 pounds per square inch and about 400 pounds per square inch.

4. A method of making cork composition which comprises forming a mixture containing a butadiene-styrene copolymer latex, cork particles, and a vulcanizing agent, said composition containing about 25 to 80 parts by weight of copolymer solids and about 100 parts by weight of cork particles, agitating the resulting mixture for about 2 to 10 minutes, thereby coagulating said butadiene-styrene copolymer latex, charging the resulting mass to a mold, heating said mass in said mold at a temperature between about 220° F. and 275° F. and a pressure of from about 25 pounds per square inch to about 400 pounds per square inch, and removing from said mold a mass of cork composition containing less than about 5% water.

5. A method of making cork composition which comprises forming a mixture containing a butadiene-acrylonitrile copolymer latex, cork particles, and a vulcanizing agent, said composition containing about 25 to 80 parts by weight of copolymer solids and about 100 parts by weight of cork particles, agitating the resulting mixture for about 2 to 10 minutes, thereby coagulating said butadiene-acrylonitrile copolymer latex, charging the resulting mass to a mold, heating said mass in said mold at a temperature between about 220° F. and 275° F. and a pressure of from about 25 pounds per square inch to about 400 pounds per square inch, and removing from said mold a mass of cork composition containing less than about 5% water.

6. A method of making cork composition which comprises forming a mixture containing a chloroprene polymer latex, cork particles, and a vulcanizing agent, said composition containing 25 to 80 parts by weight of polymer solids and about 100 parts by weight of cork particles, agitating the resulting mixture for about 2 to 10 minutes, thereby coagulating said chloroprene polymer latex, charging the resulting mass to a mold, heating said mass in said mold at a temperature between about 220° F. and 275° F. and a pressure of from about 25 pounds per square inch to about 400 pounds per square inch, and removing from said mold a mass of cork composition containing less than about 5% water.

JOHN W. WILEY.

REFERENCES CITED

The following references are of record in the file of this patent:

UNITED STATES PATENTS

| Number | Name | Date |
| --- | --- | --- |
| 1,567,506 | Hopkinson | Dec. 29, 1925 |
| 1,591,018 | Cutler | July 6, 1926 |
| 1,990,937 | Forbes | Feb. 12, 1935 |
| 2,155,429 | Levin | Apr. 25, 1939 |
| 2,196,407 | Atkinson | Apr. 9, 1940 |
| 2,279,450 | Diehl | Apr. 12, 1942 |
| 2,345,009 | Schuh | Mar. 28, 1944 |
| 2,491,715 | Clayton | Dec. 20, 1949 |